United States Patent [19]
Adin et al.

[11] Patent Number: 5,807,666
[45] Date of Patent: Sep. 15, 1998

[54] PHOTOGRAPHIC ELEMENTS WITH J-AGGREGATING CARBOCYANINE INFRARED SENSITIZING DYES

[75] Inventors: Anthony Adin, Rochester; Anne Troxell Wyand, Victor, both of N.Y.

[73] Assignee: Eastman Kodak Company, Rochester, N.Y.

[21] Appl. No.: 565,800

[22] Filed: Nov. 30, 1995

[51] Int. Cl.$^6$ ...................................... G03C 1/18
[52] U.S. Cl. .................. 430/581; 430/585; 430/587; 430/933; 430/944
[58] Field of Search .................... 430/585, 587, 430/944, 933, 581

[56] References Cited

U.S. PATENT DOCUMENTS

| | | | |
|---|---|---|---|
| 3,615,634 | 10/1971 | Bergisch-Neukirchen et al. | 96/124 |
| 3,615,635 | 10/1971 | Götze et al. | 430/587 |
| 4,115,124 | 9/1978 | Hamilton et al. | |
| 4,138,266 | 2/1979 | Hinata et al. | 96/123 |
| 4,199,360 | 4/1980 | Hinata et al. | 430/503 |
| 5,296,343 | 3/1994 | Hioki et al. | 430/508 |
| 5,338,657 | 8/1994 | Kato | 430/584 |

*Primary Examiner*—Thorl Chea
*Attorney, Agent, or Firm*—Arthur E. Kluegel

[57] ABSTRACT

The present invention provides a photographic element comprising an infrared light sensitive silver halide emulsion layer containing silver halide grains that exhibit low cubicity and are sensitized to a maximum absorption over 700 nm with a carbocyanine dye free of water soluble groups, wherein said layer additionally comprises a pyrimidino- or triazino-stilbene compound containing at least 6 sulfonic acid or sulfonate substituents.

9 Claims, No Drawings

PHOTOGRAPHIC ELEMENTS WITH J-AGGREGATING CARBOCYANINE INFRARED SENSITIZING DYES

FIELD OF THE INVENTION

This invention relates to infrared light sensitive photographic elements containing a silver halide dye sensitized emulsion of low cubicity.

BACKGROUND OF THE INVENTION

Silver halide is only inherently sensitive to ultraviolet and blue light. It is well known that sensitizing dyes can be used to extend this sensitivity to the green and red regions. In some cases it is also advantageous to extend this sensitivity into the infrared region, for example to provide improved visual contrast in aerial photography. It has been reported that aerial films that are sensitized to infrared light (that is wavelengths beyond 700 nm) display better tonal separation (for example, sharp delineation of river banks, differentiation between clean and polluted surface water, and the like), better haze penetration rendering the film of greater utility under poor weather conditions, and better performance during periods of restricted light (for example, early morning and late afternoon). For this application a sensitization maximum in the region of 700 to 750 nm is particularly desirable.

Sensitization of silver halide emulsions to infrared radiation is useful in a number of practical applications, namely laser scanned black and white and false color sensitized materials, spectroscopy and specialized camera films. For camera films, infrared photographic speeds must be high to achieve short exposure times. This is not easy since infrared sensitizing dyes tend to be inefficient sensitizers and cause emulsion fogging. Particularly efficient spectral sensitizations are obtained when sensitizing dyes are absorbed to the silver halide in the form of so called "J aggregates" (T. H. James, Theory of the Photographic Process, 4th edition, pg 218ff). Efficient J aggregating infrared sensitizing dyes are rare since the most well studied class of J aggregating dyes, the carbocyanines, with the exception described below, only sensitize in the green and red regions of the spectrum.

U.S. Pat. No. 3,615,634 describes benzoquinoline carbocyanine dyes combined with other carbocyanine dyes which provide effective infrared sensitization. Preferred dyes however must be made using carcinogenic β naphthylamine.

Some rigidized dicarbocyanine dyes can provide J aggregate sensitization beyond 700 nm (see U.S. Pat. No. 5,338,657). These dicarbocyanine dyes however do not as predictably form high proportions of J aggregates and in some cases must be added during a special heating step to promote aggregation (U.S. Pat. No. 5,296,343).

Improvements in so called speed/fog have been accomplished by changing the mode of addition of the sensitizing dye to the silver halide emulsion. U.S. Pat. No. 4,138,266 and U.S. Pat. No. 4,199,360 suggest that adding sensitizing dyes having at least one water soluble group from an aqueous solution containing a "red shift compound" gives improved speed/fog positions compared to adding the sensitizing dye from an organic solvent. It is clearly specified that the sensitizing dye must contain at least one water soluble sulfo-group.

Typically, high speed silver halide emulsions have low cubicity. Some because they comprise tabular grains and some because they are polymorphic. Such emulsions are particularly prone to dye desensitization, which increases the difficulty of obtaining high speed infrared photographic response.

It would be desirable then, to have a photographic element which is sensitive to infrared light and which exhibits an improved activity and absorbance spectra.

SUMMARY OF THE INVENTION

The present invention provides a photographic element comprising an infrared light sensitive silver halide emulsion layer containing silver halide grains that exhibit low cubicity and are sensitized to a maximum absorption over 700 nm with a carbocyanine dye free of water soluble groups, wherein said layer additionally comprises a pyrimidino- or triazino-stilbene compound containing at least 6 sulfonic acid or sulfonate substituents.

The photographic element of the invention provides sensitivity to infrared light while exhibiting improved activity and absorbance spectra.

DETAILED DESCRIPTION OF THE INVENTION

As described, the photographic element of the invention incorporates silver halide grains that exhibit low cubicity and are sensitized to a maximum absorption over 700 nm with a carbocyanine dye free of water soluble groups. By low cubicity, it is meant that the cubicity of the grains in the emulsion is less than 50% as determined by the test set forth in "Estimate of Crystal Habit of Silver Bromide Grains by Dye Adsorption", IS&T's 47th Annual Conference, Vol.1, pg. 284 (1994), which is incorporated herein by reference. In accordance with this test, Dye Q is employed to determine the total surface area of the emulsion. The total surface area can be determined from the adsorption amount of Dye Q.

Dye Q

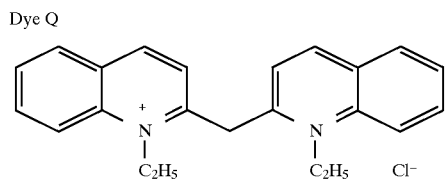

Dye "ZW" is then employed on a different sample of the emulsion to obtain a plot of extinction at 630 nm as a function of the amount of dye added, with the shift in the slope of the resulting line being indicative of the amount of surface constituting cubic as opposed to octahedral faces.

Dye ZW                                     I (or D-1)

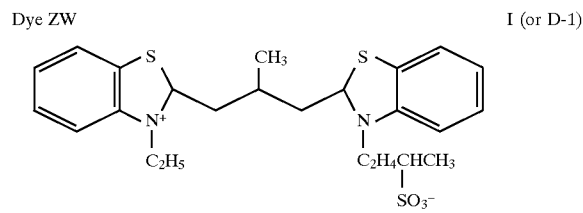

Thus, a quantitative measurement of the % cubicity is obtained by determining the amount of dye needed to cover the {100} faces and the amount of dye required to cover the total grain surfaces, as measured by the relative extinctions at 630 nm.

The carbocyanine dye of the invention must be one that J aggregates in order to achieve the desired bathochromic shift of the peak sensitivity into the infrared range above 700 nm, preferably 710–730 nm. Such dyes may be represented by the formula:

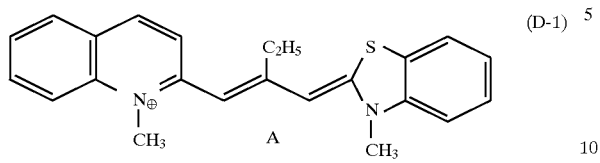
(D-1)

where A is a counterion as needed to balance the charge on the molecule.

The layer of the photographic element also contains a triazino- or pyrimidino-stilbene compound. When both the stilbene compound and the sensitizing dye of the invention are incorporated in the low cubicity emulsion of the invention, the advantageous results are obtained.

The stilbene compounds suitable for use in the invention are represented by formula II.

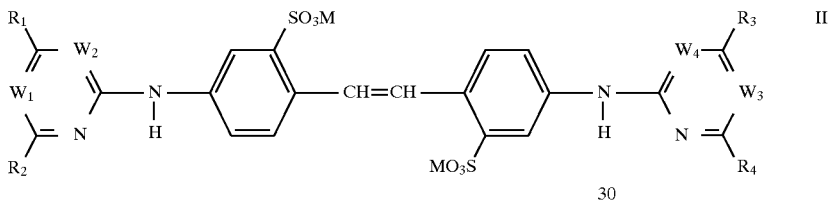
II

Each M is independently a monovalent cationic species, such as hydrogen, alkali metal or a cationic amine compound; each of $W_1$–$W_4$ is independently =N— or =CH— with at least one of $W_2$ and $W_4$ representing a =N— group; and the substituents $R_1$, $R_2$, $R_3$, and $R_4$ contain between them at least four sulfonic acid or sulfonate groups. These $R_1$, $R_2$, $R_3$, and $R_4$ substituents are independently selected from the group consisting of hydrogen, amino, alkoxy, hydroxy, alkyl, aryloxy, halogen, and mercapto groups. Particularly suitable for $R_1$, $R_2$, $R_3$, and $R_4$ are aliphatic or aromatic amine compounds such as aniline, or alkyl or hydroxy alkyl amines.

One embodiment of the invention is shown as formula III:

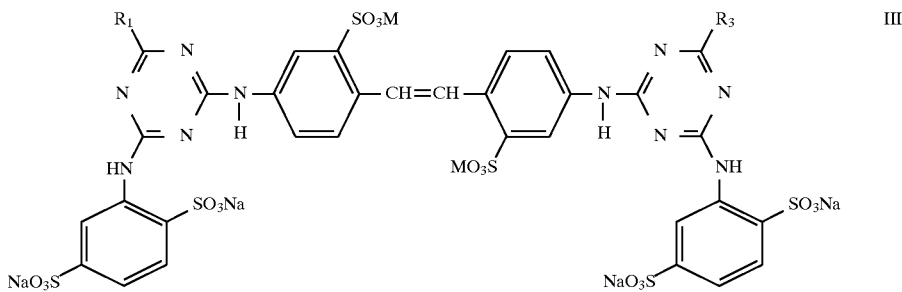
III $R_1$ and $R_3$ may be as described for formula II. More specific embodiments are shown in Formulas IV and V.

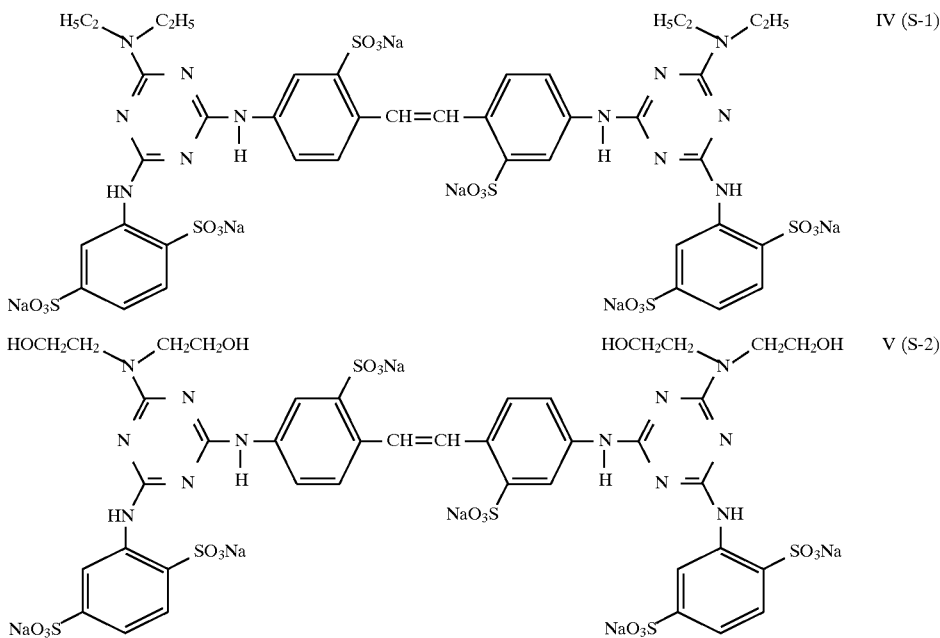

Preferably the maximum sensitization provided to the emulsion by the dye of formula (I) is greater than 710 nm or even 720 nm. Further, such maximum sensitization is preferably less than 750 nm (or even 740 or 730 nm). Such maximum sensitization is most preferably in the range of about 710 to 730 nm. By maximum sensitization in this application, is meant the maximum sensitivity of the emulsion as a result of being sensitized only with the sensitizing dye of interest (such as that of formula (I)). An emulsion may be sensitized with additional dyes, such as a red sensitizing dye, so that it has a maximum sensitivity as a result of both dyes, which is not necessarily in the infrared region. Photographic elements containing such sensitized emulsions are still within the scope of the present invention as the emulsion, if sensitized with the infrared sensitizing dye of formula (I) by itself, would have a maximum sensitivity as a result of that dye, in the required infrared region.

The amount of sensitizing dye that is useful in the invention may be from 0.001 to 10 millimoles, but is preferably in the range of 0.05 to 4.0 millimoles per mole of silver halide. Optimum dye concentrations can be determined by methods known in the art.

Dyes of formula I can be prepared according to techniques that are well-known in the art, such as described in Hamer, *Cyanine Dyes and Related Compounds,* 1964 (publisher John Wiley & Sons, New York, N.Y.) and *The Theory of the Photographic Process,* T. H. James, editor, 4th Edition, Macmillan, New York, 1977.

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)hexanamido, alpha-(4-hydroxy-3-t-butylphenoxy)tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N- dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

The photographic elements of the present invention can be black and white, single color elements or multicolor elements. Multicolor elements generally contain dye image-forming units sensitive to different regions of the spectrum. In the present case, any of the elements would have an infrared-sensitive unit which has a silver halide emulsion sensitized by a dye of formula (I), and which unit may optionally also be sensitive to the red region of the spectrum (that is, about 600 to 700 nm) as a result of being sensitized with a red sensitizing dye which by itself provides the emulsion with a maximum sensitivity in the red region. Each unit can be comprised of a single emulsion layer or of multiple emulsion layers sensitive to a given region of the spectrum. The layers of the element, including the layers of the image-forming units, can be arranged in various orders as known in the art. In a alternative format, the emulsions sensitive to each of the different regions of the spectrum can be disposed as a single segmented layer.

If desired, the photographic element can be used in conjunction with an applied magnetic layer as described in *Research Disclosure,* November 1992, Item 34390 published by Kenneth Mason Publications, Ltd., Dudley Annex, 12a North Street, Emsworth, Hampshire P010 7DQ, ENGLAND, the contents of which are incorporated herein by reference. When it is desired to employ the inventive materials in a small format film, *Research Disclosure,* June 1994, Item 36230, provides suitable embodiments.

In the following discussion of suitable materials for use in the emulsions and elements of this invention, reference will be made to *Research Disclosure,* September 1994, Item 36544, available as described above, which will be identified hereafter by the term "Research Disclosure". The contents of the Research Disclosure, including the patents and publications referenced therein, are incorporated herein by reference, and the Sections hereafter referred to are Sections of the Research Disclosure.

Except as provided, the silver halide emulsion containing elements employed in this invention can be either negative-working or positive-working as indicated by the type of processing instructions (i.e. color negative, reversal, or direct positive processing) provided with the element. Suitable emulsions and their preparation as well as methods of chemical and spectral sensitization are described in Sections I through V. Various additives such as UV dyes, brighteners other than those used in the invention, antifoggants, stabilizers, light absorbing and scattering materials, and physical property modifying addenda such as hardeners, coating aids, plasticizers, lubricants and matting agents are described, for example, in Sections II and VI through VIII. Color materials are described in Sections X through XIII. Scan facilitating is described in Section XIV. Supports, exposure, development systems, and processing methods and agents are described in Sections XV to XX. Desirable photographic elements and processing steps including other components suitable for use in photographic elements of the invention are also described in *Research Disclosure,* Item 37038, February 1995.

With negative-working silver halide, the processing step described above provides a negative image. The described elements can be processed in the known Kodak C-41 color process as described in The British Journal of Photography Annual of 1988, pages 191–198. Such negative working emulsions are typically sold with instructions to process using a color negative method such as the mentioned C-41 process. To provide a positive (or reversal) image, the color development step can be preceded by development with a non-chromogenic developing agent to develop exposed silver halide, but not form dye, and followed by uniformly fogging the element to render unexposed silver halide developable. Such reversal emulsions are typically sold with instructions to process using a color reversal process such as E-6. Alternatively, a direct positive emulsion can be employed to obtain a positive image.

Preferred color developing agents are p-phenylenediamines such as:
4-amino-N,N-diethylaniline hydrochloride,
4-amino-3-methyl-N,N-diethylaniline hydrochloride,
4-amino-3-methyl-N-ethyl-N-(2-methanesulfonamidoethyl) aniline sesquisulfate hydrate,
4-amino-3-methyl-N-ethyl-N-(2-hydroxyethyl)aniline sulfate,
4-amino-3-(2-methanesulfonamido-ethyl)-N,N-diethylaniline hydrochloride and
4-amino-N-ethyl-N-(2-methoxyethyl)-m-toluidine di-p-toluene sulfonic acid.

Development is usually followed by the conventional steps of bleaching, fixing, or bleach-fixing, to remove silver or silver halide, washing, and drying.

The entire contents of any copending applications as well as patents and other publications cited in this specification are incorporated herein by reference.
The invention is described further in the following examples.
EXAMPLES
The following comparison dyes were tested:
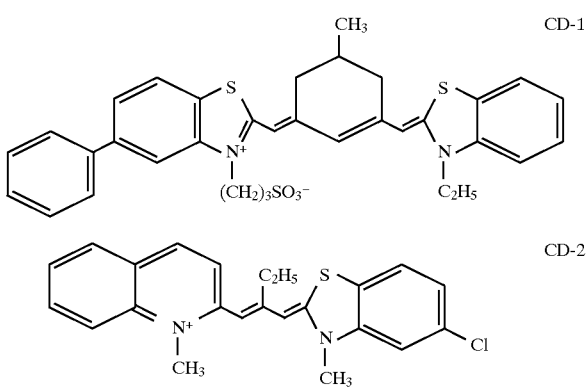
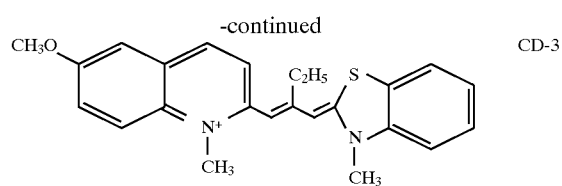
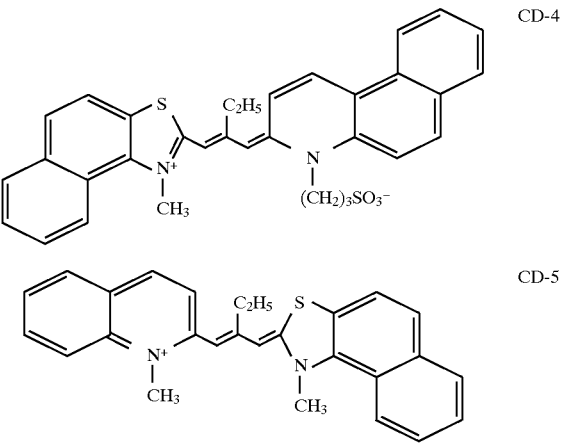
The following comparative stilbene compounds were tested:
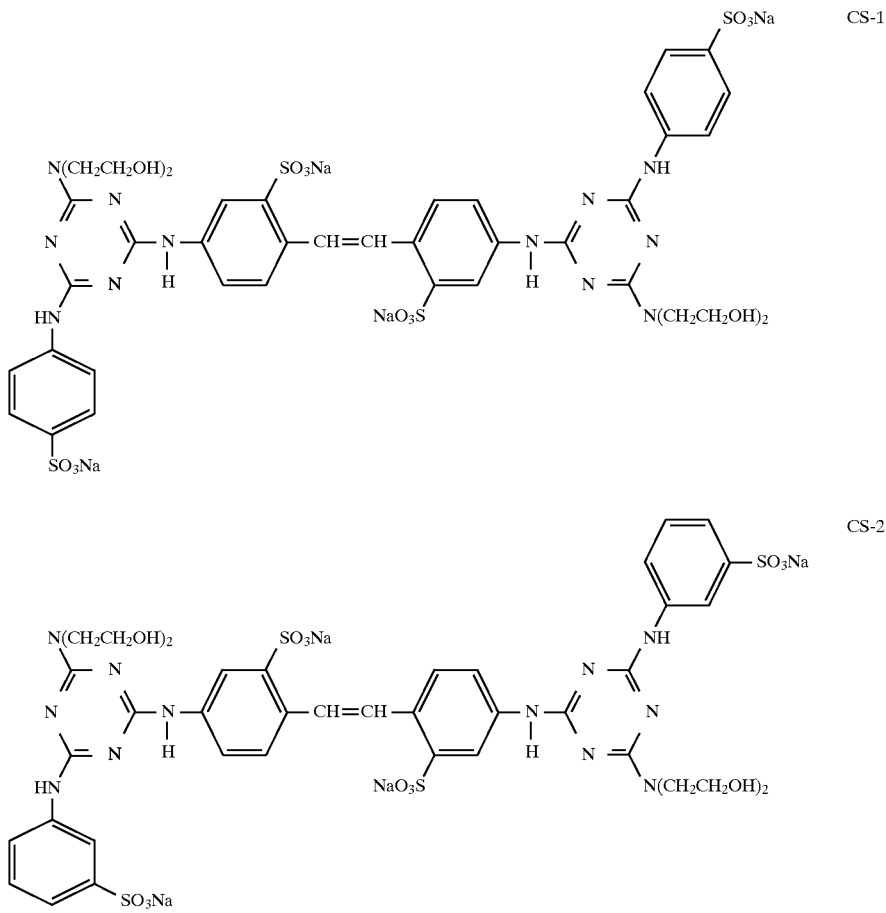

-continued

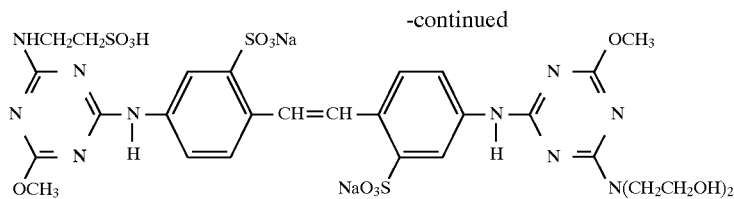

CS-3

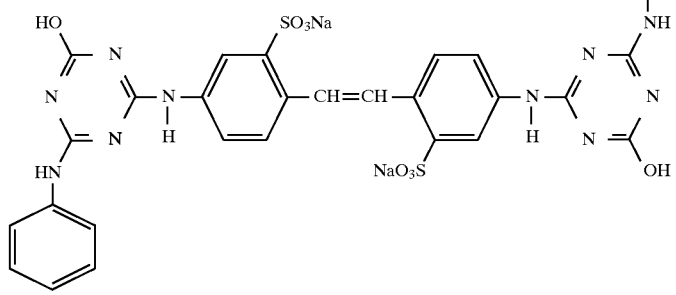

CS-4

Example 1

A sulphur plus gold sensitized 0.2 micron cubic AgBrI emulsion containing 2.6 mole % iodide was spectrally sensitized with various sensitizing dyes and coated on polyester film support at a silver laydown of 1.08 g/sq.m. and a hardened gelatin laydown of 7.3 g/sq.m. These films were exposed on a wedge spectrograph and processed in a Kodak RP-XOMAT brand processor and processed as described in U.S. Pat. No. 4,459,351, Example 3, using N-Methyl-p-aminophenol sulfate and hydroquinone developers. The wavelengths of maximum spectral sensitivity ($\lambda$max) are noted below.

TABLE I

| Sensitizing Dye | $\lambda$max (nm) |
|---|---|
| D-1 | 740 |
| CD-2 | 700 |
| CD-3 | 700 |
| CD-4 | 740 |
| CD-5 | 700 |

Only dye structures D-1 and CD-4 had maximum sensitivities beyond 700 nm.

Example 2

In the following examples, the dye and either methanol or the stilbene compound were premixed in an aqueous solution before addition to the silver halide emulsion.

A 0.74 micron edge length AgBr cube and a 0.75 micron polydisperse, polymorphic AgBrI (7%I) emulsion were chemically sensitized with sulfur plus gold. Each emulsion was dyed with 0.1 mmole/Ag mole of test sensitizing dye added as a methanolic solution and 1 g/Ag mole of tetraazaindene stabilizer was added. These emulsions were coated on a polyethylene terephthalate film support at silver and gel laydowns of 3.23 g/sq.m. An overcoat solution comprising 0.72 g/sq.m of gel and 0.04 g/sq.m of bis-vinylsulfonyl methylether was then applied. The photographic element was then exposed and developed as described in U.S. Pat. No. 4,459,351, Example 3, with a N-Methyl-p-aminophenol sulfate and hydroquinone developers. The optical absorbance spectra of these coatings were taken between the wavelengths of 400 to 900 nm. Results are summarized in Table II.

TABLE II

| EXPERIMENT | | | SENSITIZING DYE | | Half Bandwidth |
|---|---|---|---|---|---|
| DYE | TYPE | EMULSION | $\lambda$max (nm) | Dmax | (nm) |
| CD-1 | Comp | cube | 727 | 0.204 | 57 |
| CD-1 | Comp | polymorphic | 721 | 0.131 | 112 |
| D-1 | Comp | cube | 730 | 0.196 | 31 |
| D-1 | Comp | polymorphic | 700 | 0.139 | 45 |

In Table II, half bandwidth is the sensitizing dye absorbance peak width in nanometers at half the density of the maximum peak height. Both sensitizing dyes gave broader, less intense absorption peaks on the polymorphic emulsion suggesting less efficient J aggregation. The hypsochromic shift of 30 nm for carbocyanine D-1 was much larger than for the dicarbocyanine CD-1. The half bandwidths for D-1 were markedly narrower on both emulsions than for CD-1 demonstrating that carbocyanine dyes, with less extended chromophores, offer the advantage of narrower sensitization envelopes, which is very desirable for example with false sensitized color elements or for camera films to distinguish subtle variations in landscape.

The peak photographic speeds of both dyes on the polymorphic emulsion were measured using an energy normalized wedge spectrograph and black and white development. The peak speed of D-1 was 0.25logE faster than that of CD-1 demonstrating that an efficient spectral sensitization was obtained.

Example 3

Coatings similar to those described in Example 2 were prepared. A similar polymorphic AgBrI emulsion was used. The hardener was changed to bis-vinylsulfonylmethane at a level of 2% with respect to total gel. D-1 was added to the chemically sensitized polymorphic AgBrI emulsion either as a 1 g/l solution in methanol or as an aqueous solution in 20 g/l of stilbene compound S-1 of formula IV. The level of D-1 in the stilbene solution was varied between 1.33 and 3 g/l with no change in results. Data are summarized in Table III.

TABLE III

| SOLVENT | EXPERIMENT TYPE | SENSITIZING DYE λmax (nm) | Dmax | Half Bandwidth (nm) | PEAK SPEED |
|---|---|---|---|---|---|
| Methanol | Comp | 697 | 0.148 | 56 | 1.72 |
| S-1 | Inv. | 714 | 0.204 | 43 | 1.83 |

The data in Table III show that when added from the S-1 solution, the absorption peak of D-1 shifts to longer wavelengths, becomes narrower and more intense, all characteristics of more efficient J aggregation. The peak height became similar to that measured on the cubic emulsion. The peak speed, measured as in Example 1 was both increased and shifted to longer wavelength when the dye was in S-1 versus methanol, both very desirable features.

It should be noted that D-1 contains no water soluble group as taught in U.S. Pat. NO. 4,138,266 and U.S. Pat. No. 4,199,360, nor do either of these patents mention any shift in spectral sensitization of longer wavelengths. The benzoquinoline dyes described in U.S. Pat. No. 3,615,634 are used in combination with selected other carbocyanine dyes to provide strong infrared sensitization. The second dye introduces spectral sensitivity in other spectral regions reducing the flexibility of the resulting photographic element. S-1 used in Example 2 introduces no significant change in spectral sensitivity other than that due to D-1. For example, the photographic element can be made selectively sensitive to short infrared, which is useful in false sensitized color elements where narrow ranges of sensitivity are required, or can offer a wider choice in safelight selection. Having to use a second carbocyanine dye to attain efficient infrared sensitization is a limiting property.

Example 4

Coatings similar to those described in Example 3 were prepared except that the silver laydown was lowered to 2.15 g/sq.m. Adding D-1 in methanol was compared to addition as an aqueous solution or 3 g/l and 20 g/l S-2. Results are shown in Table IV.

TABLE IV

| SOLVENT | EXPERIMENT TYPE | D-1 λmax | Dmax | Half Bandwidth (nm) | PEAK SPEED |
|---|---|---|---|---|---|
| Methanol | Comp | 698 | 0.126 | 47 | 1.47 |
| S-2 | Inv. | 717 | 0.207 | 41 | 1.72 |

When added from an aqueous solution in S-2, compared to methanol, the sensitizing dye again showed the higher peak speed at a longer wavelength and a narrower, more intense absorption band characteristic of more efficient J aggregation.

Example 5

Coatings of the polymorphic, low cubicity emulsion were prepared as described in Example 2. Comparative dye CD-4 was added to the emulsion from either a methanolic solution or an aqueous solution of S-1.

TABLE V

| Dye Solvent | λmax (nm) |
|---|---|
| methanol | 717 |
| S-1/water | 712 |

Addition of CD-4 as a solution in aqueous S-1 versus methanol did not result in a shift of the dye peak to longer wavelength as was seen with dye D-1 of the invention.

Example 6

Solutions of different stilbene compounds were prepared at a concentration of 20 g/liter in water. To these stirred solutions, solid D-1 was added to give a final D-1 concentration of 2 g/liter. As noted below, dye D-1 was only completely soluble in S-1 and S-2.

TABLE VI

| Stilbene Compound | D-1 Solubility |
|---|---|
| S-1 | complete |
| S-2 | complete |
| CS-1 | partial |
| CS-2 | partial |
| CS-3 | partial |
| CS-4 | partial |

To summarize the results of the examples, CD-2, -3, and -5 provided a short wavelength of maximum sensitivity (Table I) and CD-1 provided low sensitizing dye Dmax and broad Half Bandwidth in low cubicity emulsions (Table II). S-1 and S-2 of the invention, when used with dyes of the invention, provided higher absorptance and a shift in sensitivity to longer wavelengths compared to the conventional methanol solvent (Tables III and IV). This did not occur with comparative dyes (Table V). Finally, the solubility imparted by comparative stilbene compounds was not complete as with the inventive stilbene compounds (Table VI).

While the invention has been described in detail with particular reference to preferred embodiments, it will be understood that variations and modifications can be effected within the spirit and scope of the invention.

What is claimed is:

1. A photographic element comprising an infrared light sensitive silver halide emulsion layer containing silver halide grains that exhibit low cubicity and are sensitized to a maximum absorption over 700 nm with a carbocyanine dye free of water soluble groups and containing a quinoline nucleus, wherein said layer additionally comprises a pyrimidino- or triazino-stilbene compound containing at least 6 sulfonic acid or sulfonate substituents.

2. The element of claim 1 wherein the carbocyanine dye has formula (D-2):

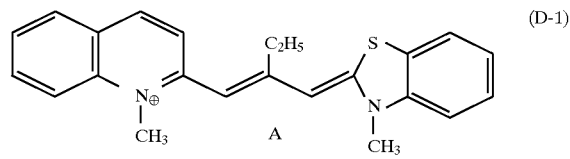

wherein A is a counterion as needed to balance the charge.

3. The element of claim 1 wherein the stilbene compound is a triazinostilbene of formula II:

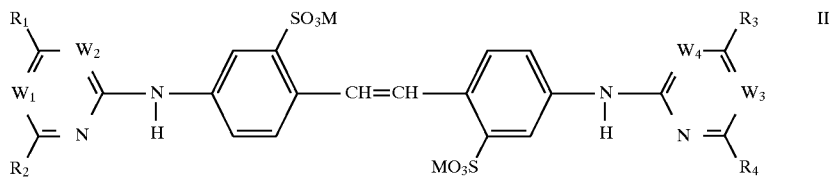

wherein each M is independently a monovalent cationic species, each of $W_1$–$W_4$ is independently =N— or =CH— with at least one of $W_2$ and $W_4$ representing a =N— group, and wherein $R_1$, $R_2$, $R_3$, and $R_4$ are substituents that contain between them at least four sulfonic acid or sulfonate groups.

4. The element of claim 3 wherein $R_1$, $R_2$, $R_3$, and $R_4$ are independently selected from the group consisting of hydrogen, amino, alkoxy, hydroxy, alkyl, aryloxy, halogen, and mercapto groups.

5. The element of claim 4 wherein the stilbene compound is represented by formula III:

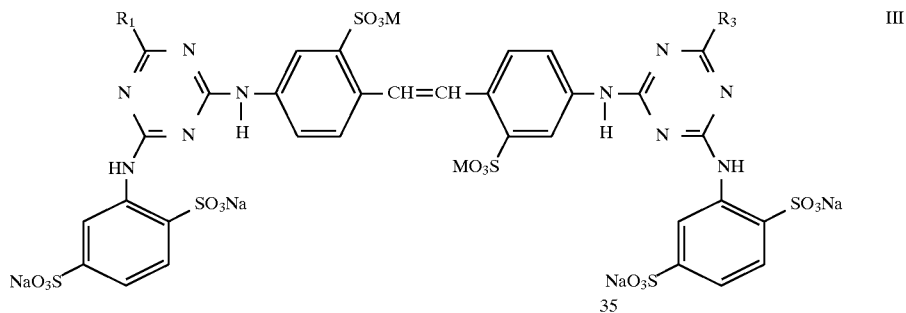

wherein each M is independently a monovalent cationic species.

6. The element of claim 5 wherein $R_1$ and $R_3$ are independently selected from the group consisting of amino, alkyl and alkoxy groups.

7. The element of claim 6 wherein the stilbene compound is represented by formula IV:

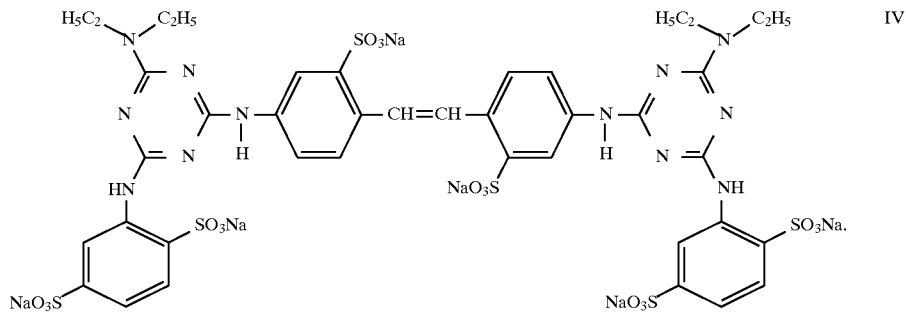

8. The element of claim 6 wherein the stilbene compound is represented by formula V:

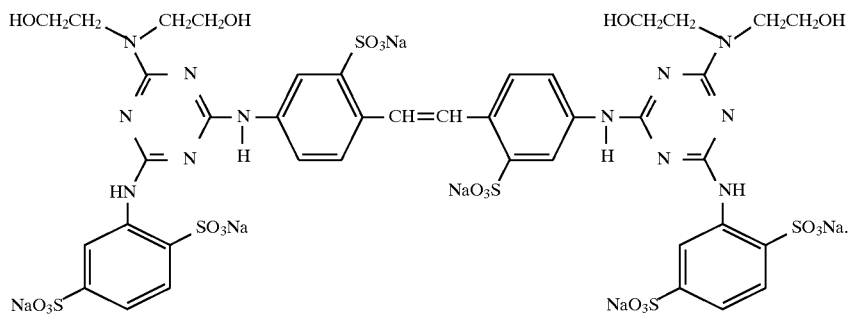

9. A method of spectrally sensitizing an emulsion of dispersed silver halide grains that exhibit low cubicity to a maximum absorption over 700 nm, comprising combining a carbocyanine dye free of water soluble groups and containing a quinoline nucleus with a stilbene compound selected from the group consisting of a triazinostilbene and pyrimidinostilbene compounds containing at least 6 sulfonic acid substituents, and then combining said mixture with said emulsion.

* * * * *